US012730729B2

(12) United States Patent
Mandal

(10) Patent No.: US 12,730,729 B2
(45) Date of Patent: Sep. 8, 2026

(54) ADDING A REDUNDANT NETWORK PATH FOR THE NFSROOT ON A RUNNING DISKLESS SYSTEM

(71) Applicant: Palo Alto Networks, Inc., Santa Clara, CA (US)

(72) Inventor: Ashis Mandal, Fremont, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 54 days.

(21) Appl. No.: 18/814,220

(22) Filed: Aug. 23, 2024

(65) Prior Publication Data

US 2026/0056852 A1 Feb. 26, 2026

(51) Int. Cl.
*G06F 11/20* (2006.01)
*G06F 16/182* (2019.01)

(52) U.S. Cl.
CPC ........ *G06F 11/2002* (2013.01); *G06F 11/203* (2013.01); *G06F 16/183* (2019.01)

(58) Field of Classification Search
CPC ... G06F 11/2002; G06F 16/183; G06F 11/203
See application file for complete search history.

(56) References Cited

U.S. PATENT DOCUMENTS 7,124,320 B1 10/2006 Wipfel
7,739,546 B1 6/2010 Rodrigues
9,811,428 B2 11/2017 Ramasubramaniam
10,127,055 B2 11/2018 Shih
10,721,290 B2 7/2020 Gill
2020/0136956 A1* 4/2020 Neshat .................... H04L 45/22

FOREIGN PATENT DOCUMENTS

CN 116112500 A * 5/2023 ......... H04L 67/1034

OTHER PUBLICATIONS

Blanchet, Sebastien. "Read-only NFS Root with Debian 10" for Institut Radio Astronomie Millimetrique. Jan. 22, 2020 (Year: 2020).*

Fan, Joel. "mount.nfs: access denied by server while mounting" on StackOverflow. Jan. 31, 2010. Retrieved from the Internet <URL:https://serverfault.com/questions/107546/mount-nfs-access-denied-by-server-while-mounting> (Year: 2010).*

(Continued)

*Primary Examiner* — Ashish Thomas
*Assistant Examiner* — Bryan P Huang
(74) *Attorney, Agent, or Firm* — Van Pelt, Yi & James LLP

(57) ABSTRACT

The present application discloses a method, system, and computer system for adding a redundant network path for an NFS root on a diskless system. The method includes: (a) generating, by a system initialization script, a RAM disk, wherein the system initialization script is executed after an operating system switches a root mount point to an NFS filesystem and initialization is performed, (b) copying a binary to the RAM disk, (c) launching the binary as a user-space program, and (d) executing, by the user-space program, a command from an already-running NFS-backed user-space program to move the NFS on a redundant Ethernet path after the redundant Ethernet path has been initialized.

26 Claims, 6 Drawing Sheets

(56) References Cited

OTHER PUBLICATIONS

Kutkov, Oleg. "Monitoring Linux networking state using netlink". Feb. 14, 2018. Retrieved from the Internet <URL:https://olegkutkov.me/2018/02/14/monitoring-linux-networking-state-using-netlink/> (Year: 2018).*

Wikipedia. "Longest prefix match". Nov. 20, 2023. Retrieved from the Internet <URL:https://en.wikipedia.org/w/index.php?title=Longest_prefix_match&oldid=1186105230>. (Year: 2023).*

Muuss, Mike. "The Story of the Ping Program". Archived from Oct. 25, 2019. Retrieved from the Internet <URL:https://web.archive.org/web/20191025013201/https://ftp.arl.army.mil/~mike/ping.html> (Year: 2019).*

Shepler, S. Storespeed Inc., Eisler, M., Noveck, D. and NetApp. "Network File SYstem (NFS) Version 4 Minor Version 1 Protocol". Jan. 2010. (Year: 2010).*

Stanford University. "Software". Archived from Aug. 5, 2014. Retrieved from the Internet <URL: https://web.archive.org/web/20140805023537/https://web.stanford.edu/class/cs101/software-1.html>. (Year: 2014).*

Wikipedia. "Static build". Mar. 30, 2024. Retrieved from the Internet <URL:https://en.wikipedia.org/w/index.php?title=Static_build&oldid=1216342346>. (Year: 2024).*

* cited by examiner

200

400

500

600

ADDING A REDUNDANT NETWORK PATH FOR THE NFSROOT ON A RUNNING DISKLESS SYSTEM

BACKGROUND OF THE INVENTION

Diskless computer systems, also known as thin clients, have gained widespread adoption due to their cost efficiency, ease of management, and enhanced security. These systems rely on network-based booting and centralized storage for their operating system and application data. Typically, a diskless system boots from a network server using the Preboot Execution Environment (PXE) and mounts its root filesystem over the network via NFS.

BRIEF DESCRIPTION OF THE DRAWINGS

Various embodiments of the invention are disclosed in the following detailed description and the accompanying drawings.

DETAILED DESCRIPTION

Figure 1:
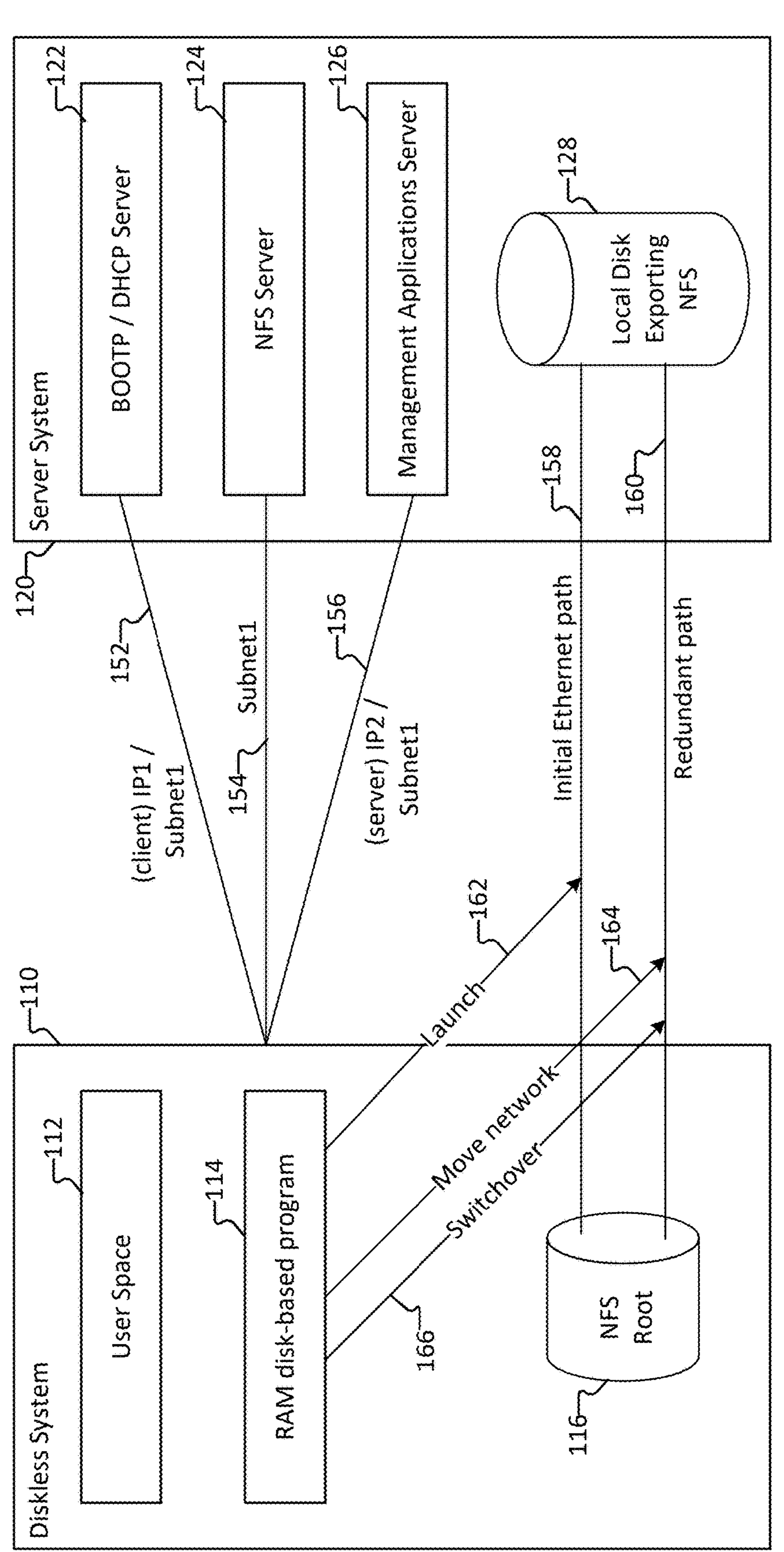
FIG. 1 is a block diagram of an environment for configuring a redundant path for an NFS root on a diskless system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments provide a diskless computer system and, more particularly, a method and system for establishing an NFS (Network File System) root and configuring a redundant communication path between the diskless system and the server system hosting the NFS, with failover capabilities in response to a failure of the primary communication path.

Various embodiments provide a method, system, and computer system for configuring a diskless system to enable failovers in the event of failures in a communication path (e.g., a communication path between the diskless system and a server system, such as the NFS system). For example, the method, system, and computer system are configured to add a redundant network path for an NFS root (also sometimes referred to as an NFSroot) on a diskless system. In some embodiments, the method includes: (a) generating, by a system initialization script, a RAM disk, wherein the system initialization script is executed after an operating system switches a root mount point to an NFS filesystem and initialization is performed, (b) copying a binary to the RAM disk, (c) launching the binary as a user-space program, and (d) executing, by the user-space program, a command from an already-running NFS-backed user-space program to move the NFS on a redundant Ethernet path after the redundant Ethernet path has been initialized.

Despite the numerous advantages of diskless systems, one significant challenge is ensuring reliable and continuous network connectivity between the diskless client and the server. Network failures, such as the loss of a primary Ethernet path, can disrupt the operation of the diskless system, leading to downtime and potential data loss. Therefore, there is a need for a system that can not only establish an NFS root for diskless systems but also provide redundant communication paths to maintain connectivity in the event of a network failure.

Existing solutions for network redundancy typically involve complex configurations and require dynamic reconfiguration of network settings, which may not be feasible for diskless systems that rely on static configurations for booting and operation. Furthermore, there is a need for logging mechanisms to record network failures and failovers, enabling system administrators to perform diagnostics and improve the reliability of the network infrastructure.

A diskless system may be a type of computing setup where the client machines (workstations, desktops, or servers) operate without local disk storage. Instead, diskless systems conventionally rely on networked servers for their operating system, applications, and data storage. Diskless systems rely on a dedicated server or set of servers to provide storage via protocols like NFS (Network File System) or iSCSI (Internet Small Computer Systems Interface). An example of a diskless system includes a fabric access device (e.g., a line chip card) in a modular/chassis based system (e.g. PA7500). In such diskless systems a suitable bootloader boots the kernel over an ethernet network connected to a disk-booted card, typically called the management card, which serves as the Dynamic Host Configuration Protocol (DHCP) server for the image of the kernel. The server system serves the image for networking OS or the needed applications for the runtime of the diskless system. At the diskless system, the kernel boots up and mounts an NFS that was exported by the server system. The diskless card uses the NFS as the root filesystem for the rest of its life.

Establishing an NFS (Network File System) root for a diskless system involves setting up the necessary configurations on both the server and client sides to allow the client machines to boot and operate using an NFS-mounted root filesystem.

In diskless systems according to the related art, the ethernet network that helped boot the system is a single point of failure. In order to mitigate the risk of the communication path (e.g., the ethernet path) between the diskless system and the server system, various embodiments configure a redundant path. The redundant path could be complex to set up initially with help of user-space drivers and programs. However, such a redundant path may be far more resilient. For example, in the case that diskless system includes a fabric access device in a modular/chassis based system (e.g. PA7500), the redundant path can be implemented over multiple ASICs with further hardware-based redundancy.

According to related art diskless systems, in connection with operation of the diskless system and corresponding server system, IP connections are made from both sides—the server system and the diskless systems. Redesigning networking OS or apps to facilitate different communications between the diskless systems and the server systems, such as for the redundant path, is complex and expensive, and thus infeasible. Various embodiments maintain the existing connections to avoid redesigning of the networking OS or the apps.

In some embodiments, the diskless system and server systems use 802.3ad active/backup link aggregation, and the second link can be used as the backup link (e.g., the connection for the redundant path). However, implementation of the 802.3ad active/backup link aggregation may not always be possible or practical. For example, the paths using 802.3ad active/backup link aggregation are not symmetric, and requires elaborate configurations on ASIC or a software-based data path. A redundant path according to such an implementation may require user-space driver logic. Additionally, or alternatively, the driver may not support adding the new network interface as part of Linux bonding, assuming the OS is Linux.

According to various embodiments, the diskless system controls the failover, including monitoring the current path (e.g., the primary or initial ethernet path) and trigger a failover in the event of a detected failure. This control of the failover is implemented from a user-space application. For example, the use of a user-space application to control the failover enables an case of deployment and maintenance compared to doing the same from the kernel space of the diskless system. However, executables running from NFS root may not have required code resident in memory to achieve the failover. The code may need to be brought in to memory by the NFS client in order to complete the runtime logic to move the NFS over the redundant path, which will fail unpredictably in the middle of the move causing a hung system.

Various embodiments address the challenges associated with related art diskless systems by providing a method and system for establishing an NFS root (root mount point to an NFS filesystem), configuring redundant communication paths, and enabling automatic failover in response to network failures. Various embodiments implement a program running in a static binary on the diskless system, which logs failures and failovers to facilitate failure diagnostics. Accordingly, the reliability and robustness of diskless systems are enhanced by ensuring continuous network connectivity through redundant communication paths and providing logging capabilities for effective failure diagnostics. The program running in the static binary may be a user-space program configured for autonomous or controlled switchovers.

According to various embodiments, the user-space comprises at least two types of user-space programs. In some embodiments, a first type of user-space program (e.g., control-path-mover-agent) runs out of static binary in the (RAM-backed) temporary file storage (also referred to herein as tmpfs) which services commands (from another user-space program, such as the second-type of user-space program). The first type of user-space program can also monitor for a failure of a current running path and perform autonomous move on failure detection. In some embodiments, a second type of user-space program (e.g., redundant-control-path-creator/-manager) commands to move the IP to the redundant path which is also backed by a highly-available distributed hardware path, after it has been able to configure and ready that path. The second type of user-space program can also listen to commanded moves or autonomous moves completion (e.g., across NFS revival) to trigger a post-path-move activity (e.g., specific routes, IP filter if any on the new netdev that is now assigned with the control path IP), and can launch a detailed data collection for troubleshooting and future enhancements.

FIG. 1 is a block diagram of an environment for configuring a redundant path for an NFS root on a diskless system according to various embodiments. In some embodiments, system 100 implements one or more of processes 300-600 of FIG. 3-6. In the example shown, system 100 comprises diskless system 110 and server system 120. Although system 100 is described in the context of a Linux system, various other types of systems may be implemented.

According to various embodiments, configuring the diskless system 100 with a redundant path includes ensuring the diskless system 110 is set up to boot via a Preboot Execution Environment (PXE). PXE is a standard that allows systems to boot from a network interface independently of available data storge devices or installed operating systems. Booting via PXE refers to the process by which a computer boots up and loads its operating system or other software over a network, rather than from a local storage device like a hard drive or SSD. This typically involves configuring the BIOS or UEFI settings to prioritize network booting. PXE leverages DHCP and TFTP protocols to obtain the necessary boot files and initiate the boot process. This approach offers significant benefits in terms of management, maintenance, and scalability, making it a popular choice in environments with large numbers of diskless or thin-client machines.

When diskless system 110, which is configured for PXE booting, starts up, diskless system 110 sends a DHCP request to obtain an IP address. For example, diskless system 110 establishes an initial communication path 158 (e.g., an initial ethernet path) between diskless system 110 and server system 120. In response to receiving the DHCP request, server system 120 (e.g., BOOTP/DHSCP server 122) responds with an IP address and also provides information about the location of the boot server. For example, at 152, BOOTP/DHSCP server provides diskless system 110 with the IP address and subnet 152 for the boot server (e.g., NFS server 124).

After obtaining an IP address, the diskless system 110 can use TFTP to download the initial bootloader (e.g., PXE-LINUX) from the boot server (e.g., server system 120). In some embodiments, the diskless system 110 in a PXE booting environment typically downloads the boot loader from a TFTP server. The TFTP server can be hosted on the same physical or virtual machine as NFS server 123 and/or management application server 126.

NFS server 124 provides the root filesystem for the diskless clients (e.g., diskless system 110) after the boot loader has been executed and the initial boot stages are completed. Once the boot loader is executed (e.g., at diskless system 110), the boot loader can connect to NFS server 124 (e.g., via a subnet obtained during the PXE booting) and use NFS server 124 to load the operating system kernel and initial ramdisk (e.g., initrd). After the kernel and initrd are loaded, diskless system 110 mounts its root filesystem (e.g., NFS root 116) from NFS server 124.

In some embodiments, the system can use this initrd to host and launch the static binary mover agent.

Management applications server 125 can host management software and utilities for administering the PXE environment (e.g., diskless system 110). Examples of the management software and utilities include management tools, monitoring tools, and deployment scripts. Management application server 126 typically does not serve boot files to diskless system 110 during the boot process (e.g., the PXE boot process). However, in some embodiments, system 100 can use management application server 126 to serve the boot file(s). Additionally, in some embodiments, management application server 125 configures the DHCP and TFTP servers, manages the operating system images, and/or automates the deployment of updates (e.g., to diskless system 110).

At 154, diskless system 100 uses the information about the location of the boot server (e.g., the subnet) to locate and/or communicate with the NFS server 124.

At 156, diskless system 100 uses the information about the boot server to locate and/or communicate with management applications server 125. For example, diskless system 110 obtains the address for the management application card running on server system 120. In some embodiments, one subnet is used to define the entire network (e.g., a single subnet is used for IP1 NFS server 124 and IP2 for connecting to management application server 126).

Diskless system 100 obtains the kernel from server system 120 and launches the kernel and initrd. The kernel initializes and mounts the root filesystem from NFS server 124. As an example, the kernel runs an early stage of a user-level process. In some embodiments, after the switch to the NFS root 116 and initialization is complete, diskless system 110 creates a RAM disk using the tmpfs filesystem. For example, in response to initializing the NFS root 116, diskless system 100 executes a system initialization script (e.g., an re script) to create the RAM disk using the tmpfs filesystem.

A user space 112 can obtain and run binaries over NFS (e.g., via a connection between NFS root 116 at diskless system 110 and a local disk 128 exporting the NFS at server system 120). According to various embodiments, diskless system 110 (e.g., user space 112) copies a static binary to the tmpfs and, at 162, launched as a user-space program (e.g., RAM disk-based program 114). The binary (e.g., the static binary) becomes resident in memory, such as because it is backed by the RAM disk. Because the binary is resident in the memory, if the NFS root 116 is temporarily broken (e.g., the connection between NFS root 116 and the local disk 128 at server system 120), the ability of the user-space program is not impacted. For example, the user-space program (e.g., RAM disk-based program 114) may comprise the logic used to continue to operate. In some embodiments, the user-space program comprises failover logic that can be executed in response to the NFS root 116 being temporarily broken, such as to ensure continued operation of diskless system 110. The user-space program can persist the NFS root (e.g., failover) because the user-space program comprises the failover logic and does not require any additional logic and/or information from the kernel-space program. As an example, the logic in the user-space program does not require any assistance from the kernel-space program to execute the failover and/or to log information pertaining to the failover. In some embodiments, the failover logic does not comprise any kernel code or runtime change.

According to various embodiments, the static binary comprises information and/or logic that comprises one or more of (a) an indication of a redundant path, (b) logic for establishing the redundant path, (c) logic for monitoring the redundant path, and (d) logic for logging information pertaining to failovers in response to detecting a failover. The static binary comprises logic to enable continued operation in the event of a failure of the connection between NFS root 116 and NFS exporter 128. In some embodiments, the user-space program is based on a static-binary to ensure that it does not create a big load such as with dynamic libraries.

In some embodiments, the static binary (e.g., the binary executing in RAM disk-based program 114) comprises all of the logic needed to detect a failure in a connection between NFS root 116 and local disk 128 exporting the NFS, and to implement a failover to the redundant path. For example, the static binary comprises a complete code resident in memory (e.g., the user-space RAM disk) and does not require any additional information from the NFS client to resolve a failover. Similarly, after the communication path has failed over to the redundant path, the user-space program can continue to monitor the communication paths and switch back to the initial path upon the initial path being reestablished or switch back to the initial path if the redundant path fails (e.g., the user-space program can continue to failover across the initial path and redundant path, etc.).

According to various embodiments, the user-space comprises at least two types of user-space programs. In some embodiments, a first type of user-space program (e.g., control-path-mover-agent) runs out of static binary in the (RAM-backed) tmpfs which services commands (from another user-space program, such as the second-type of user-space program). The first type of user-space program can also monitor for a failure of a current running path and perform autonomous move on failure detection. In some embodiments, a second type of user-space program (e.g., redundant-control-path-creator/-manager) commands to move the IP to the redundant path which is also backed by a highly-available distributed hardware path, after it has been able to configure and ready that path. The second type of user-space program can also listen to commanded moves or autonomous moves completion (e.g., across NFS revival) to trigger a post-path-move activity (e.g., specific routes, IP filter if any on the new netdev that is now assigned with the control path IP), and can launch a detailed data collection for troubleshooting and future enhancements.

Diskless system 110 establishes an initial communication path 158 (e.g., an ethernet path) between the NFS root 116 at diskless system 110 and a local disk 128 at server system 120. In some embodiments, the user-space program (e.g., a static binary) additionally establishes a redundant communication path 160 (e.g., a redundant ethernet path) between NFS root 116 and the local disk 128. In connection with establishing the redundant communication path 160, at 164, the user-space program (e.g., RAM disk-based program 114) moves the NFS (e.g., the NFS root 116) to the redundant communication path 160, such as after the redundant communication path 160 is initialized and ready (e.g., by the commander). For example, user-space program moves the control network IP on the other netdev. The command and response can be handled over a named pipe. However, the command and response can be implemented by other common IPC mechanisms available.

The user-space program monitors the path between NFS root 116 and the local disk 128 running at server system 120 for a failure and to initiate a failover. In some embodiments, the user-space program monitors the path based at least in part on registering/signing up for a kernel notification, such as over a NETLINK socket. The user-space program registers for a kernel notification of an interface state change, such as to check the path from the Ethernet layer. In some embodiments, the user-space program additionally executes a ping (e.g., a ping process) to server system 120 to check/monitor the path from the IP layer.

According to various embodiments, in response to detecting a failure over a current path (e.g., the initial communication path 158), at 166, the user-space program executes a switchover to the redundant communication path 160. Additionally, in some embodiments, in response to detecting the failure over the current path, the user-space program logs the failure/failover event. For example, the user-space program stores information pertaining to the failure. The user-space program can log key error and information over the console of the system, so the triaging becomes very clear even in the case of failed failover. The information pertaining to the failure/failover event logged by the system can be stored on the console device, such a diskless system 110. As an example, in the case that a failover fails, the user-space program can log that a failure occurred and it tried to perform a switchover to a redundant path (e.g., the failover) but was unsuccessful.

The user-space program can achieve the failover by bringing down the failed interface, removing its IP address, adding the same IP address with earlier subnet mask on the redundant interface, and bringing up the new interface. In some embodiments, the NFS client is TCP-based, and thus its resiliency is maintained across the failover.

According to various embodiments, system 100 (e.g., diskless system 110) implements a static binary. In contrast, related art diskless systems relied on dynamic libraries. Because various embodiments implement the static binary, the system 100 can eliminate the need of copy of a large set of shared library objects just to run one user-space program. For example, all logic can be implemented using a static binary of few MB size, which is important because the backing RAM space is expensive. Additionally, the use of a static binary can also eliminate the extra setup work required to separate the shared library loading path within the tmpfs only, and not referencing the root filesystem on NFS which is temporarily defunct.

Additionally, the use of a static binary from a user-space program comprising the failover logic eliminates or reduces the need for a special kernel-space development, which can be difficult to implement, debug, and deploy across various platforms.

According to various embodiments, the failover and the logging of information pertaining to the failure or failover is under control of a fully memory-resident program (e.g., the user-space program). Because the functionality is included in the user-space program (e.g., the static binary), the failover control can be implemented without an additional hardware mechanism to log the failure over the communication path. For example, the failover control and logging of failures can be implemented as a software-only implementation.

Various embodiments implement the failover control using an 802.3ad link aggregation. For example, the absence of a link-level (e.g., interface-level) failure does not necessarily mean the functionality works at the IP-level. According to various embodiments, an IP-level failure, which can include possible link level failure, is protected so the diskless system remains functional using the existing NFSroot and control path IP.

Figure 2:
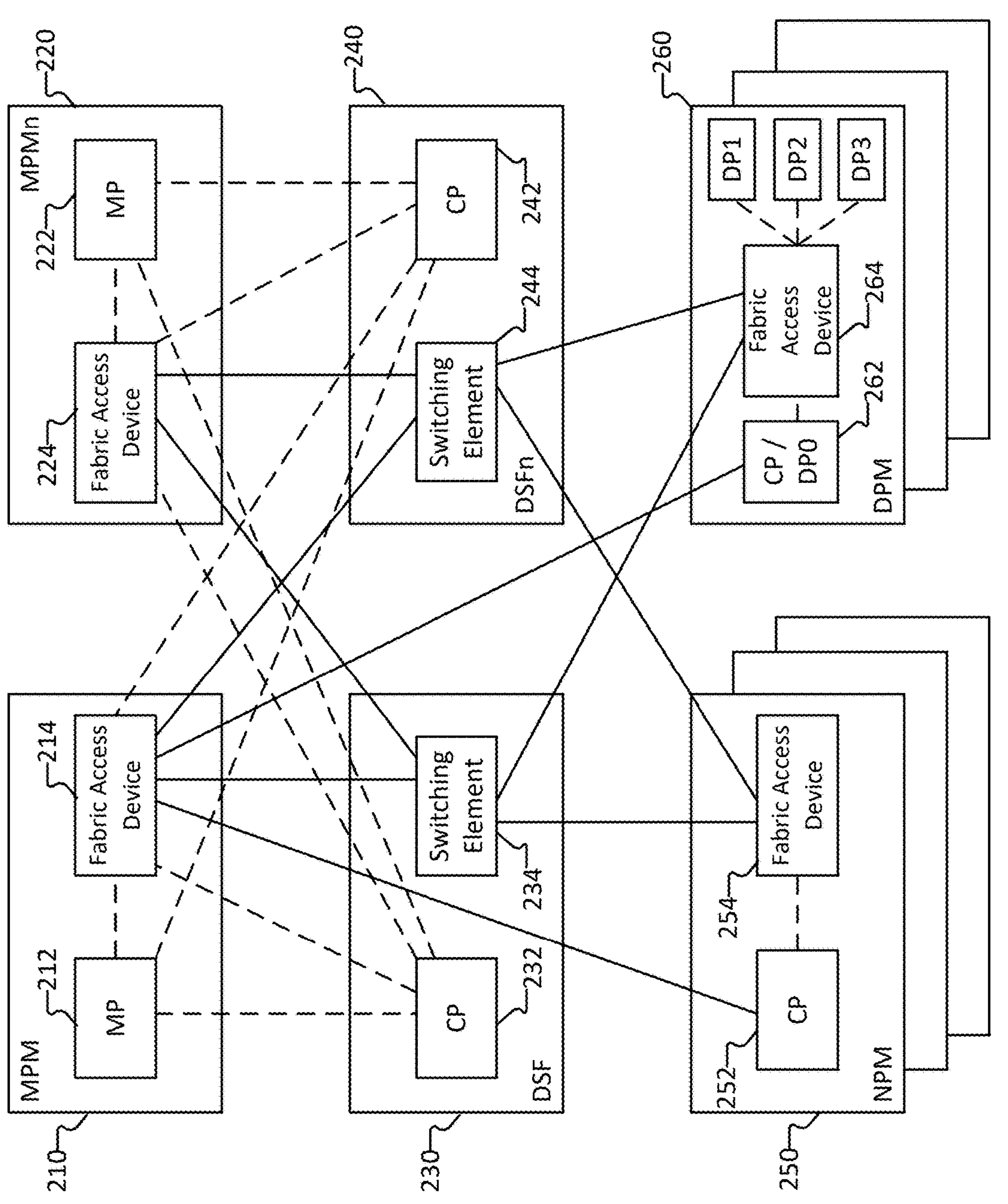
FIG. 2 is a block diagram of an environment for configuring a redundant path for an NFS root on a diskless system according to various embodiments.

FIG. 2 is a block diagram of an environment for configuring a redundant path for an NFS root on a diskless system according to various embodiments. In some embodiments, system 200 implements one or more of processes 300-600 of FIG. 3-6. System 200 may be implemented at least in part by system 100. In the example shown, system 200 comprises a server side and a diskless system side. The server side may comprise, or correspond to, a management plane. The management plane comprises a set of management plane machines, such as MPM 210 and MPMn 220. MPMn can denote that n instances may exist to add redundancy and availability of management plane services, where n is a positive integer. As an illustrative example, a management plane machine may include a board, device, entity, etc. The diskless system side may comprise one or more diskless cards, such as one or more network cards (e.g., network processing machine (NPM) 250, etc.) and/or one or more data processing cards (e.g., data processing machine (DPM) 260). A network processing machine (NPM) may be a network-booted machine (NBM) or a diskless system. An NPM is an example of a network-booted host machine or fabric access device for sharing various network data load in its specific hardware device elements, e.g. to serve switching, traffic management (qos/policy), specialized ASICs, or even processing certain data loads on its CPUs. A DPM is an example of a network-booted host machine to process network data load for second stage processing involving CPU and crypto devices primarily. Various embodiments may comprise multiple instances of DPMs. Other instances like DPM1 . . . n support balancing larger processing loads.

According to various embodiments, diskless network processing and data processing cards have separate devices for control plane and data plane. The Data plane usually comprises traffic management silicon devices (e.g., Jericho2c) that connect to highly-available distributed switching fabric devices (e.g., Ramon) to form a distributed switching layer. A logical portion of this data plane can be used for control path communication after it has been initialized by the card, as a redundant control path.

System 200 may additionally comprise a switching layer comprising one or more switch cards such as DSF 230 and DSFn 240. DSFn can denote that n instances may exist to add redundancy and availability of a distributed switching fabric machine, where n is a positive integer. As an illustrative example, a distributed switching fabric machine may include a board, a device, an entity, a switching card, etc. The switching layer can give redundancy to the communication paths. In some embodiments, each network card connects to at least one switch card.

According to various embodiments, a diskless system is implemented by one or more network cards and/or one or more data processing cards. Network cards may comprise a control plane and a fabric access device. The fabric access device may be implemented, for example, by a Jericho2c card manufactured by Broadcom. As illustrated, network processing machine (NPM) 250 comprises control plane 252 and fabric access device 254. Similarly, data processing cards may comprise a control plane, a fabric access device, and one or more data planes. The fabric access device in a data processing card may also be implemented by, for example, a Jericho2c card. As illustrated, DPM 260 comprises CP/DP0 262, fabric access device 265, DP1, DP2, and DP3. CP/DP0 262 may be implemented as data plane DP0 comprising a control plane. The fabric access device 265 is configured by CP/DP0 262. The data planes DP1, DP2, and DP3 are different from CP/DP0 262 because CP/DP0 262 has a control plane component which can serve a management function.

In some embodiments, the fabric access devices in the network cards and/or data processing cards is connected to a switching element card at the switching layer. For example, fabric access device 254 of NPM 250 connects to switching element 234 of switching card DSF 230 and/or switching element 244 of distributed switching fabric machine (e.g., a switching card) DSFn 240. Similarly, as illustrated, fabric access device 265 of DPM 260 connects to switching element 234 and switching element 244. The switching cards can be implemented in connection giving the data path redundancy. Switching elements such as switching element 234 and/or 244 is implemented by a Ramon card manufactured by Broadcom.

According to various embodiments, an NFS server is running on the management plane, such as on MPM 210 and MPMn 220. For example, the management plane (MPM 210 and MPMn 220) exports the NFS to one or more diskless systems. The diskless systems initiate a boot (e.g., NPM 250 launches fabric access device 254) and establish an initial ethernet path between the diskless systems and the server side (e.g., the management plane). For example, NPM 250 executes a bios which sends a request for booting and obtains information for the DHCP server. In connection with booting, the diskless systems connect with the server side and downloads the boot loader (e.g., from a TFTP server). For example, NPM 250 and/or DPM 260 downloads a boot loader and executes the boot loader. When a diskless system executes the boot loader, the boot loader (e.g., NPM 250 and/or DPM 260) connects to an NFS server exposed by the management plane. As an illustrative example, the boot loader causes CP 252 of NPM 250 to connect to fabric access device 214 of MPM 210 and/or fabric access device 224 of MPMn 220. The connection between the CP 252 of NPM 250 and MPM 210 (e.g., via fabric access device 214) may correspond to the initial ethernet connection. In response to establishing the connection with the management plane (e.g., the server side), the diskless system (e.g., NPM 250) obtains the kernel, loads the kernel, and mounts the root filesystem (e.g., the NFS root). The diskless system obtains and runs a binary over the NFS root. For example, the diskless system obtains the static binary and executes the static binary as a user-space program.

The diskless system establishes a highly available redundant path. In some embodiments, the system establishes a plurality of communication paths either directly with the server side (e.g., the management plan) or indirectly via one or more switching card. For example, the diskless system can use the switching card to provide redundancy to the communication paths between the diskless system and the server side. In the example shown, NPM 250 (e.g., CP 252) establishes a direct connection with MPM 210 (e.g., fabric access device 214) and a plurality of indirect connections via DSF 230 and DSFn 240, such as via switching element 234 and switching element 244. The switching cards (e.g., DSF 230 and DSFn 240) can further establish a plurality of connections with the management plane, such as via CP 232 and/or CP 242. As illustrated, CP 232 establishes a plurality of connections (e.g., direct connections) with MPM 210, such as to MP 212 and fabric access device 214. Similarly, CP 232 can establish a plurality of connections (e.g., direct connections) with MPMn 220, such as with MP 222 and/or fabric access device 224.

According to various embodiments, the user-space program (e.g., the static binary) executing in the diskless system (e.g., diskless cards NPM 250 and/or DPM 260) can monitor the communication paths, or at least the initial communication paths (e.g., the direct communication paths, such as the direct connection between the control plane and the fabric access device at the management plane), and perform a failover to another communication path (e.g., at least one of the redundant paths, such as a redundant or indirect path via the switch card). The user-space program can perform the failover by executing code/functionality in the static binary. For example, in some embodiments, the user-space program can perform the failover by executing code in the static binary without obtaining (or executing) additional code/functionality from the kernel space. The static binary may comprise all the necessary logic for the diskless system (e.g., the user-space program) to detect a failure in a communication path and to perform a failover.

Additionally, the user-space program logs information pertaining to the failure and/or failover. For example, to log the information, the user-space program can write the information on the console. The console log will thus provide insight into specifically what happened during the failure/failover.

According to various embodiments, the NBM has PXE support in its BIOS, such as in order to obtain an operating system (OS), build an NFS, and run subsequent applications over NFS. Other entities, such as an MPM or a DSF can be virtual hosts or mixes of physical and virtual entities, serving their primary functions like management plane services and redundant/highly-available switching plane fabric respectively.

Figure 3:
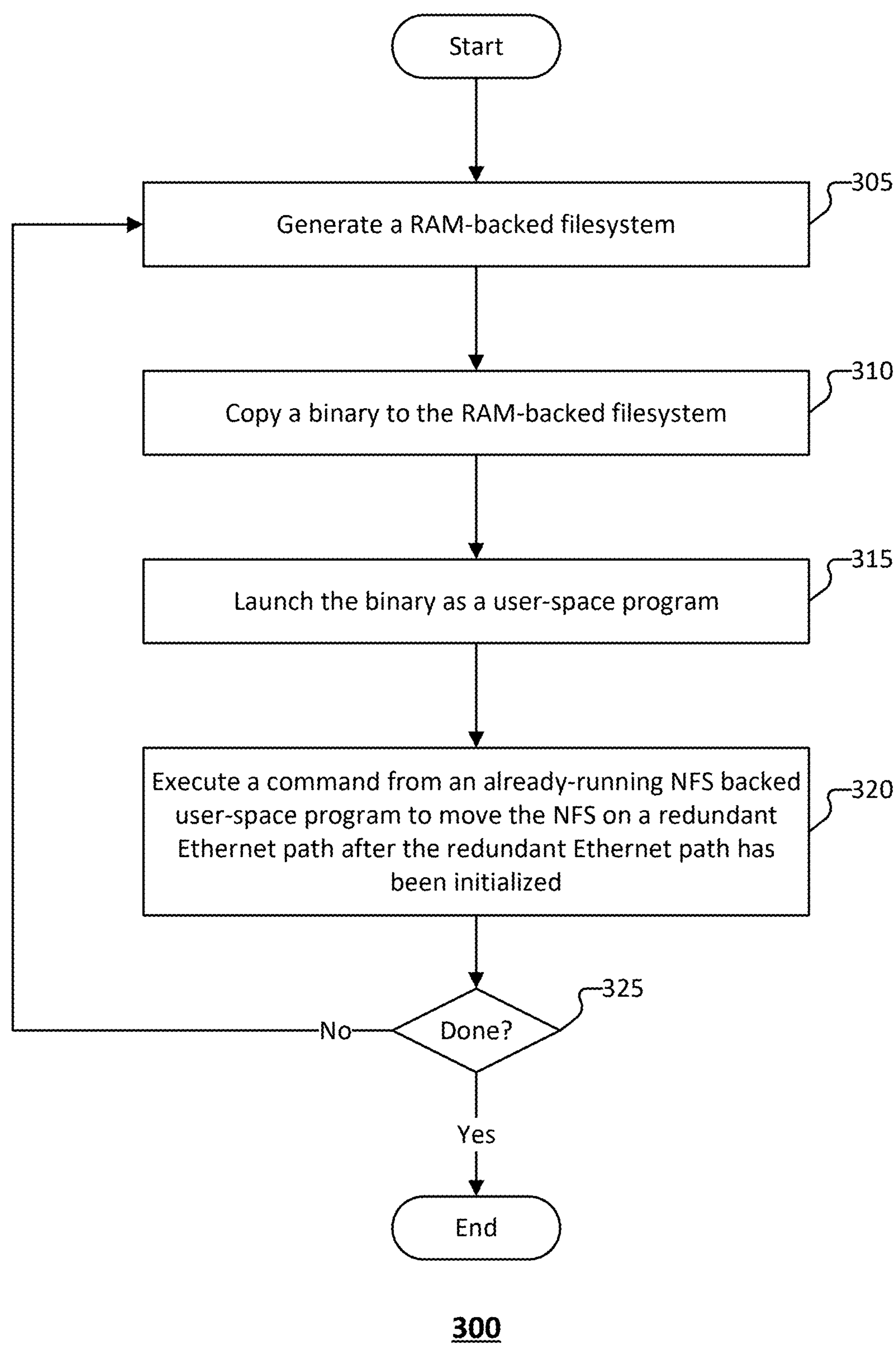
FIG. 3 is a flow diagram of a method for configuring a redundant path for an NFS root on a diskless system according to various embodiments.

FIG. 3 is a flow diagram of a method for configuring a redundant path for an NFS root on a diskless system according to various embodiments. In some embodiments, process 300 is implemented by system 100 of FIG. 1 and/or system 200 of FIG. 2. For example, process 300 is implemented by diskless system 110 of system 100.

According to various embodiments, process 300 is implemented by a diskless system. For example, process 300 is implemented in connection with booting or initializing the diskless system. The diskless system implements process 300 to configure the diskless system to be robust through failure of communication paths, such as to establish redundant communication paths to which the diskless system can failover.

At 305, the system generates a RAM-backed filesystem. For example, generates a RAM-backed filesystem of type tmpfs, which may also be referred to herein as a RAM disk. In some embodiments, the system generates the RAM disk after the kernel has been initialized and the root filesystem has been mounted (e.g., the NFS root has been initialized). The system can create the RAM based disk (e.g., a RAM-based filesystem) on executing an initialization script. At 310, the system copies a binary to the RAM-backed filesystem (e.g., RAM disk). In response to generating the RAM disk, the system obtain a binary and stores the binary to the RAM disk. The binary may be a static binary that is sufficiently small to fit within the RAM disk, and comprises the code/functionality for performing a failover. In some embodiments, the static binary comprises the code/functionality necessary for performing the failover, such as without obtaining (e.g., executing) failover functionality from the kernel. The static binary comprises information and/or logic that comprises one or more of (a) an indication of a redundant path, (b) logic for establishing the redundant path, (c) logic for monitoring the redundant path, and (d) logic for logging information pertaining to failovers in response to detecting a failover. At 315, the system launches the binary as a user-space program. For example, the diskless system launches the static binary in the user-space of the generated RAM. At 320, the system executes a command from an already-running NFS-backed user-space program to move the NFS on a redundant Ethernet path after the redundant Ethernet path has been initialized. In response to the binary being launched as a user-space program, the user-space program can initialize one or more redundant communication paths with the server side to enable the user-space program to perform a failover of communication between the diskless system and the server side. At 325, a determination is made as to whether process 300 is complete. In some embodiments, process 300 is determined to be complete in response to a determination that no further redundant paths are to be configured, an administrator indicates that process 300 is to be paused or stopped, etc. In response to a determination that process 300 is complete, process 300 ends. In response to a determination that process 300 is not complete, process 300 returns to 305.

Figure 4:
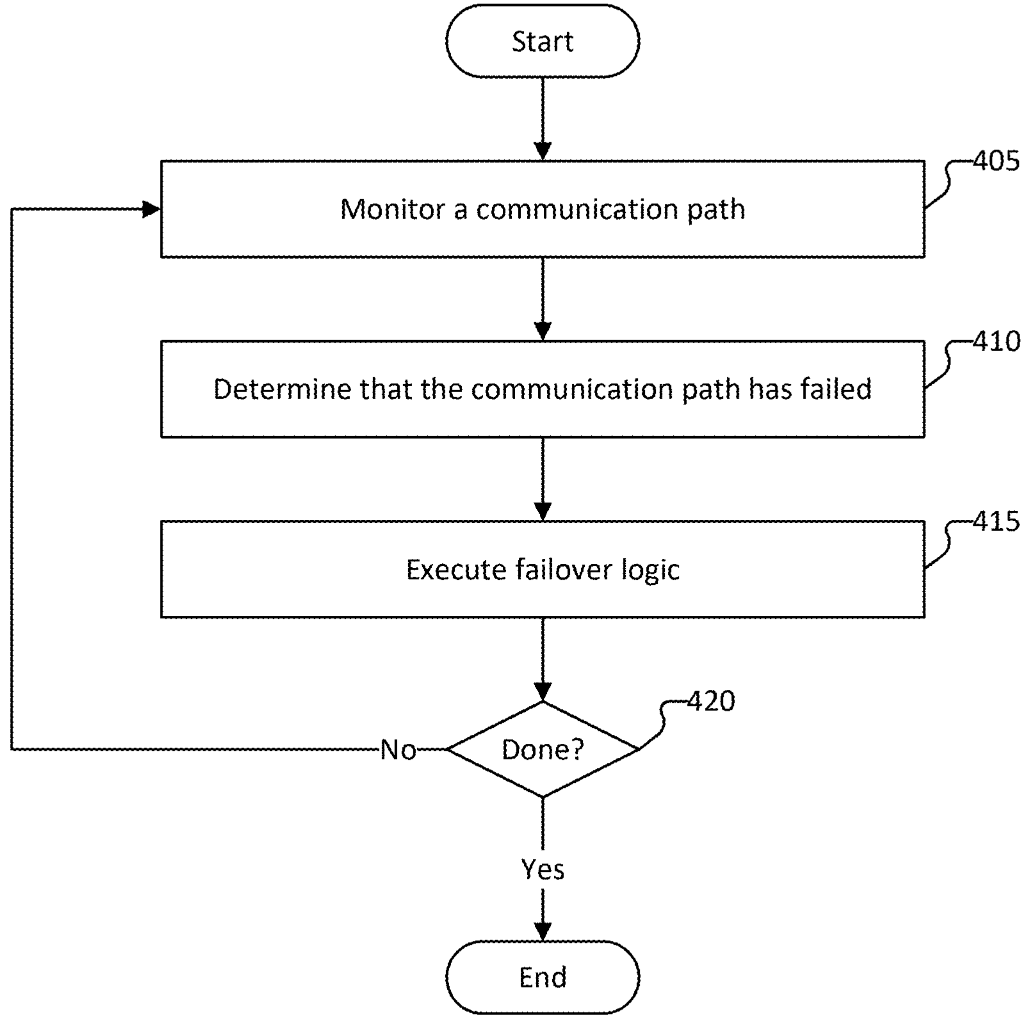
FIG. 4 is a flow diagram of a method for performing a failover for a communication path for an NFS root running on a diskless system according to various embodiments.

FIG. 4 is a flow diagram of a method for performing a failover for a communication path for an NFS root running on a diskless system according to various embodiments. In some embodiments, process 400 is implemented by system 100 of FIG. 1 and/or system 200 of FIG. 2. For example, process 400 is implemented by diskless system 110 of system 100.

According to various embodiments, process 400 is implemented by a diskless system. For example, process 400 is implemented in connection with executing a user-space program based on a static binary stored in the RAM for the diskless system. The diskless system implements process 400 to perform a failover to a redundant communication path in response to a failure with respect to the current communication path.

At 405, the system monitors a communication path. In some embodiments, a user-space program executing a static binary stored in the RAM disk for the diskless system can monitor the communication path between the diskless system and a server side (e.g., an NFS server providing a local disk that exports the NFS to the diskless system NFS root). The system can monitor the communication path based on the user-space program registering for a kernel notification of an interface state change, such as to check the path from the Ethernet layer. The system can additionally check or monitor the communication path(s) from the IP layer, such as by implementing a ping to the server side.

At 410, the system determines that the communication path has failed. The user-space program can determine that a failure occurred with respect to the communication path based at least in part on the monitoring of the communication path. In some embodiments, the determination that the communication path is determined by code executing within the user-space (e.g., the static binary) in the diskless system, such as without executing functionality outside the user-space (e.g., without executing functionality in the kernel space) that is directed to determining a status of, or failure with respect to, a current communication path.

At 415, the system executes the failover logic. In some embodiments, executing the failover logic includes invoking process 500. The user-space program executes the failover logic in response to detecting a failure with respect to the communication path. The failover logic may be stored in the static binary. For example, the diskless system (e.g., the user-space program) can perform the failover without relying on or executing failover logic in the kernel space or otherwise outside the user-space. In some embodiments, the failover logic is fully encapsulated in the static binary. The executing the failover logic may include one or more of determining a redundant path (e.g., in the case of a plurality of redundant paths having been established), performing a switchover from the communication path impacted by the failure to a redundant communication path, and logging information pertaining to the failure and/or failover.

At 420, a determination is made as to whether process 400 is complete. In some embodiments, process 400 is determined to be complete in response to a determination that no further redundant paths are to be configured, a diskless system is shutdown or is not to perform any further processing, an administrator indicates that process 400 is to be paused or stopped, etc. In response to a determination that process 400 is complete, process 400 ends. In response to a determination that process 400 is not complete, process 400 returns to 405.

Figure 5:
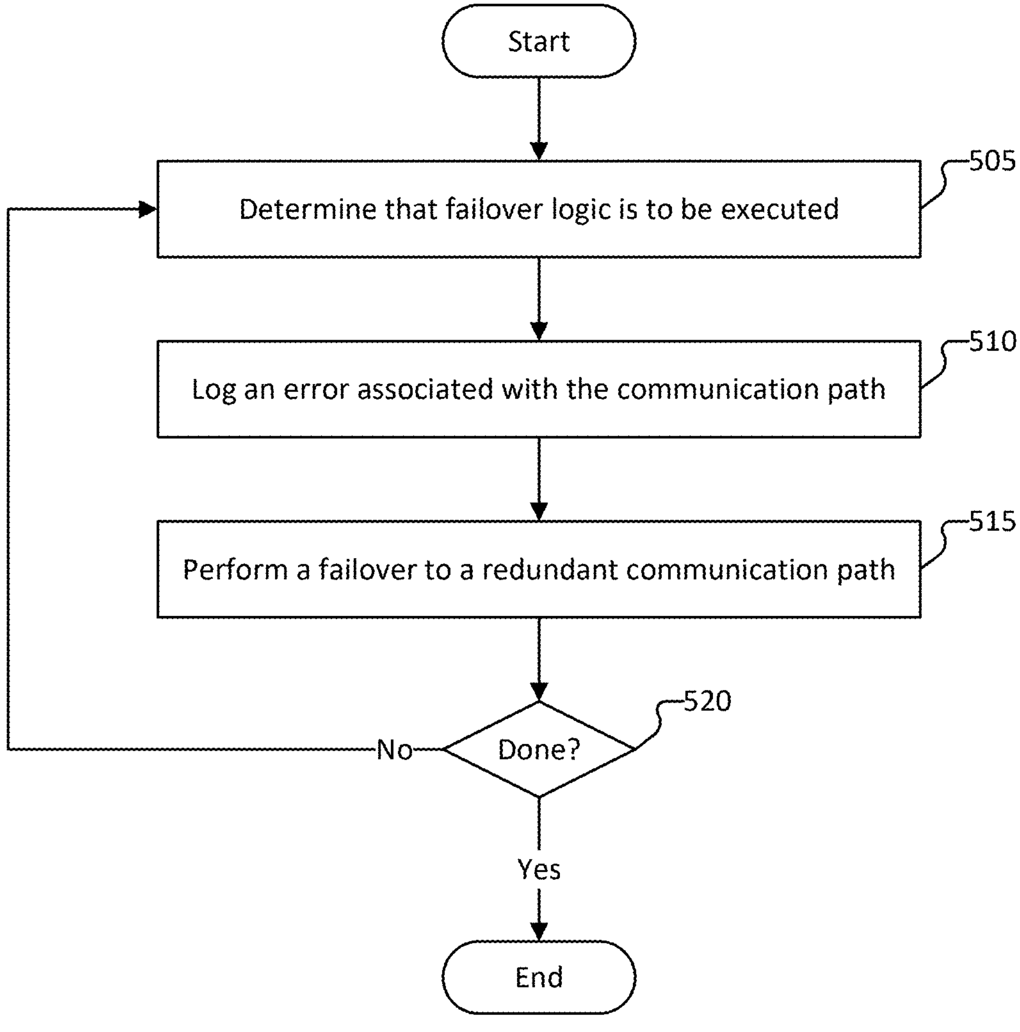
FIG. 5 is a flow diagram of a method for executing failover logic to use a different a communication path for an NFS root running on a diskless system according to various embodiments.

FIG. 5 is a flow diagram of a method for executing failover logic to use a different a communication path for an NFS root running on a diskless system according to various embodiments. In some embodiments, process 500 is implemented by system 100 of FIG. 1 and/or system 200 of FIG. 2. For example, process 500 is implemented by diskless system 110 of system 100.

In some embodiments, process 500 is invoked by process 400, such as at 415.

According to various embodiments, process 400 is implemented by a diskless system. For example, process 500 is implemented in connection with executing a user-space program based on a static binary stored in the RAM for the diskless system. The diskless system implements process 400 to perform a failover to a redundant communication path in response to a failure with respect to the current communication path.

At 505, the system determines that failover logic is to be executed. The system can determine that the failover logic is to be executed based on process 500 being invoked or otherwise based on a determination that a failure has occurred with respect to communication over a current communication path (e.g., an initial communication path). In some embodiments, the failover logic is fully encapsulated/comprised in the static binary. For example, the user-space program executing the static binary does not rely on failover logic outside the RAM disk (e.g., outside the user-space of the diskless system).

At 510, the system logs an error associated with the communication path. The system can log an error associated with the communication path on a console to trigger an contemporaneous (e.g., immediate) troubleshooting by the console capturing entity hosted externally (e.g., a management plane machine (MPM), a distributed switching fabric (DSF), or an external machine/entity watching/monitoring the console log). For example, to log the information, the user-space program can write the information on the console. The console log will thus provide insight into specifically what happened during the failure/failover. The logged error can be used to diagnose the failure.

At 515, the system performs a failover to a redundant communication path. For example, the user-space program performs a switchover of communication from the communication impacted by the failure to one of the redundant path that had been initialized by the user-space program executing the static binary.

At 520, a determination is made as to whether process 500 is complete. In some embodiments, process 500 is determined to be complete in response to a determination that no further failovers are to be performed, a diskless system is shutdown or is not to perform any further processing, an administrator indicates that process 500 is to be paused or stopped, etc. In response to a determination that process 500 is complete, process 500 ends. In response to a determination that process 500 is not complete, process 500 returns to 505.

Figure 6:
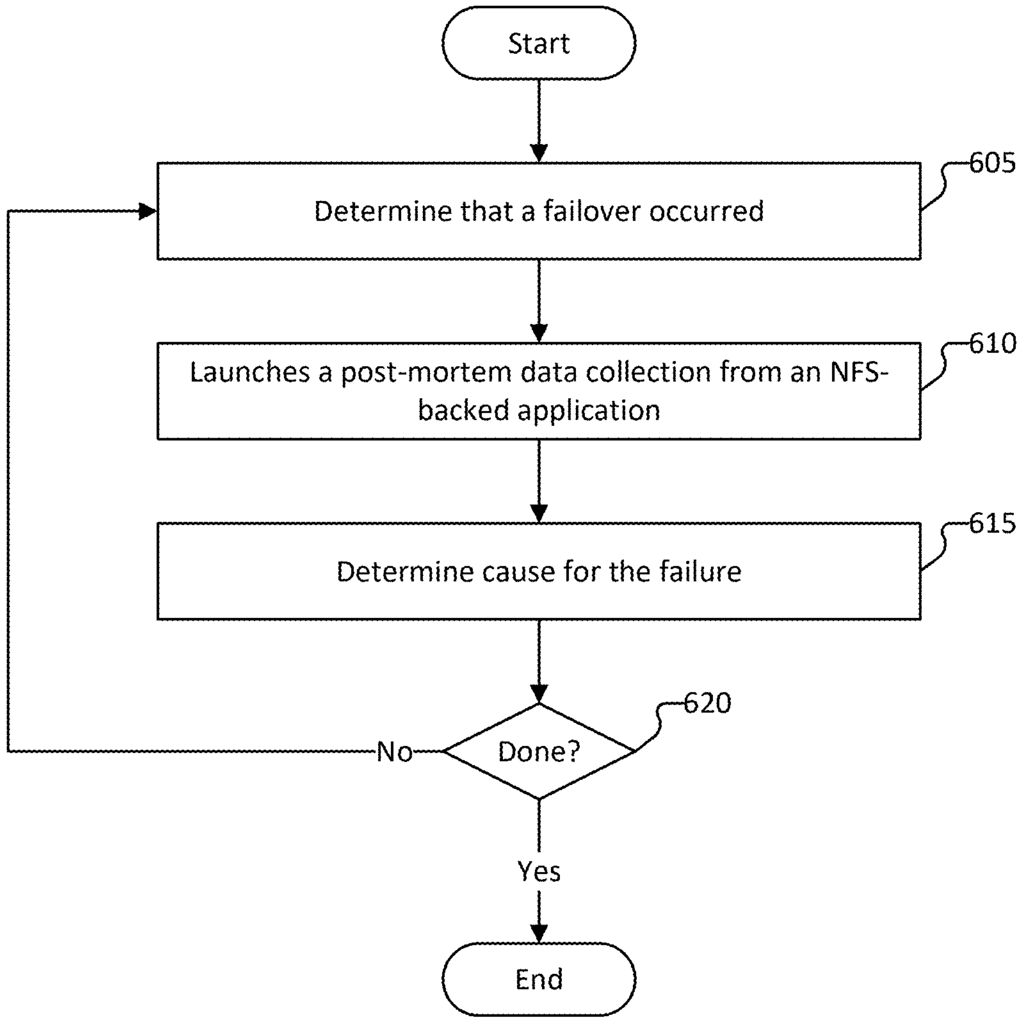
FIG. 6 is a flow diagram of a method for performing a diagnostic for determining a cause for a failure of a communication path for an NFS root running on a diskless system according to various embodiments.

FIG. 6 is a flow diagram of a method for performing a diagnostic for determining a cause for a failure of a communication path for an NFS root running on a diskless system according to various embodiments. In some embodiments, process 600 is implemented by system 100 of FIG. 1 and/or system 200 of FIG. 2. For example, process 600 is implemented by diskless system 110 of system 100. As another example, process 600 may be implemented by server system 120 of system 100.

At 605, the system determines that a failover occurred. At 610, the system launches a post-mortem data collection from an NFS-backed application (e.g., for future troubleshooting/enhancements). For example, the system launches the post-mortem data collection because it is fully functional again. In some embodiments, the system queries an error log for information pertaining to the failure. At 615, the system determines a cause for the failure. The system determines the cause for the failure based at least in part on the information pertaining to the failure. For example, the system determines that communication for the NFS root running on the diskless system failed over to a redundant communication path in response to a failure of the primary/current communication path. At 620, a determination is made as to whether process 600 is complete. In some embodiments, process 600 is determined to be complete in response to a determination that no further failovers are to be performed, a diskless system is shutdown or is not to perform any further processing, an administrator indicates that process 600 is to be paused or stopped, etc. In response to a determination that process 600 is complete, process 600 ends. In response to a determination that process 600 is not complete, process 600 returns to 605.

Although process 600 is described as being invoked in response to determining that a failover occurred, the system may query the error log (or general log maintained by the diskless system) periodically and perform a diagnostic for any detected failures/failovers.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for adding a redundant network path for an NFS root on a diskless system, comprising:

one or more processors configured to:

generate, by a system initialization script, a RAM disk, wherein the system initialization script is executed after an operating system switches a root mount point to an NFS filesystem and initialization is performed;

copy a binary to the RAM disk;

launch the binary as a user-space program, wherein the binary is a static binary that includes failover logic so that the user-space program performs a failover to the redundant Ethernet path without requiring additional code or libraries to be fetched over the NFS filesystem during the failover; and execute, by the user-space program, a command from an already-running NFS-backed user-space program to move the NFS on a redundant Ethernet path after the redundant Ethernet path has been initialized; and a memory coupled to the one or more processors and configured to provide the one or more processors with instructions.

2. The system of claim 1, wherein the operating system is Linux-based.

3. The system of claim 1, wherein the system initialization script is a run control (rc) script.

4. The system of claim 1, wherein the RAM disk is generated using a temporary filesystem (tmpfs).

5. The system of claim 1, wherein the redundant Ethernet path is a highly available Ethernet path.

6. The system of claim 1, wherein the binary is a static binary resident on a memory of the RAM disk.

7. The system of claim 1, wherein:

the binary comprises failover logic; and in response to a breaking of a connection for the NFS filesystem, the failover logic in the binary is executed from the user-space program.

8. The system of claim 1, wherein the user-space program monitors a primary Ethernet path for a failure and in response to detecting the failure in the primary Ethernet path, initiates a failover to the redundant Ethernet path.

9. The system of claim 8, wherein the user-space program monitors the primary Ethernet path for the failure based at least in part on signing up for a kernel notification over a NETLINK socket for an interface state change.

10. The system of claim 9, wherein the user-space program checks a path from an Ethernet layer based at least in part on the kernel notification.

11. The system of claim 1, wherein the user-space program logs an occurrence of errors and corresponding error information.

12. The system of claim 11, wherein in response to determining a failed failover to the redundant Ethernet path, the user-space program logs an occurrence of the failed failover.

13. The system of claim 1, wherein the user-space program causes a connection with a server to failover to the redundant Ethernet based at least in part on bringing down a failed interface, removing an IP address for the failed interface, and adding the IP address with an earlier subnet mask on a redundant interface, and bringing the redundant interface up over the redundant Ethernet path.

14. The system of claim 1, wherein an NFS client running on the diskless system is TCP-based.

15. The system of claim 1, wherein a single IP address is used for communication over a primary Ethernet path and the redundant Ethernet path in the event of a controlled or autonomous switchover.

16. The system of claim 1, wherein the redundant Ethernet path is asymmetrical with respect to a primary Ethernet path.

17. The system of claim 1, wherein an NFS client running on the diskless system causes failover logic to be stored in to the RAM disk.

18. The system of claim 1, wherein the user-space program executes a ping to a server system to monitor a primary Ethernet path from an IP layer.

19. The system of claim 1, wherein the binary fully encapsulates failover logic for performing a switchover to the redundant Ethernet path.

20. The system of claim 1, wherein the binary comprises failover logic so that the user-space program performs a failover to the redundant Ethernet path without executing failover logic outside the RAM disk.

21. The system of claim 1, wherein the command is communicated to the user-space program over a named pipe.

22. The system of claim 1, wherein the already-running NFS-backed user-space program listens for completion of the move to the redundant Ethernet path across NFS revival, and in response triggers a post-path-move activity comprising at least one of adding specific routes or IP filters on a new network device assigned with a control path IP.

23. The system of claim 1, wherein the redundant Ethernet path comprises a logical portion of a data plane of a network processing machine that is configured by a control plane of the network processing machine, and wherein the data plane is connected to a distributed switching fabric that provides hardware-level redundancy across multiple switching cards.

24. The system of claim 1, wherein the user-space program is configured to perform an autonomous failover to the redundant Ethernet path upon detecting a failure of the primary Ethernet path without receiving a command from the already-running NFS-backed user-space program, and is further configured to perform a commanded failover in response to receiving the command from the already-running NFS-backed user-space program.

25. A method for adding a redundant network path for an NFS root on a diskless system, comprising:

generating, by a system initialization script, a RAM disk, wherein the system initialization script is executed after an operating system switches a root mount point to an NFS filesystem and initialization is performed;

copying a binary to the RAM disk;

launching the binary as a user-space program, wherein the binary is a static binary that includes failover logic so that the user-space program performs a failover to the redundant Ethernet path without requiring additional code or libraries to be fetched over the NFS filesystem during the failover; and executing, by the user-space program, a command from an already-running NFS-backed user-space program to move the NFS on a redundant Ethernet path after the redundant Ethernet path has been initialized.

26. A computer program product embodied in a non-transitory computer readable medium and comprising computer instructions for:

generating, by a system initialization script, a RAM disk, wherein the system initialization script is executed after an operating system switches a root mount point to an NFS filesystem and initialization is performed;

copying a binary to the RAM disk;

launching the binary as a user-space program, wherein the binary is a static binary that includes failover logic so that the user-space program performs a failover to a redundant Ethernet path without requiring additional code or libraries to be fetched over the NFS filesystem during the failover; and executing, by the user-space program, a command from an already-running NFS-backed user-space program to move the NFS on a redundant Ethernet path after the redundant Ethernet path has been initialized.

* * * * *